(12) United States Patent
Tene et al.

(10) Patent No.: US 7,577,801 B1
(45) Date of Patent: Aug. 18, 2009

(54) ARRAY ACCESS

(75) Inventors: Gil Tene, Los Alto Hills, CA (US); Jack H. Choquette, Mountain View, CA (US); Scott Sellers, Menlo Park, CA (US); Cliff N. Click, Jr., San Jose, CA (US)

(73) Assignee: Azul Systems, Inc., Mountain View, CA (US)

( * ) Notice: Subject to any disclaimer, the term of this patent is extended or adjusted under 35 U.S.C. 154(b) by 246 days.

(21) Appl. No.: 11/296,191

(22) Filed: Dec. 6, 2005

(51) Int. Cl.
*G06F 12/02* (2006.01)

(52) U.S. Cl. .................. 711/154; 711/163

(58) Field of Classification Search .......... None
See application file for complete search history.

(56) References Cited

U.S. PATENT DOCUMENTS

| 6,014,723 | A  | 1/2000 | Tremblay et al. |
| 6,408,383 | B1 | 6/2002 | Tremblay et al. |
| 6,542,990 | B1 | 4/2003 | Tremblay et al. |
| 6,892,295 | B2 | 5/2005 | Saulsbury       |

*Primary Examiner*—Hyung S Sough
*Assistant Examiner*—Ngoc V Dinh
(74) *Attorney, Agent, or Firm*—Van Pelt, Yi & James LLP

(57) ABSTRACT

Accessing memory in an array includes performing a first instruction, including by determining whether an index used by the first instruction is within a valid range and in the event that the index is within a valid range, determining a memory address related to an array element that corresponds to the index. Accessing memory in the array further includes, in the event that the index is within a valid range, performing a second instruction to access the array element, the access being based at least in part on the memory address determined by the first instruction.

37 Claims, 4 Drawing Sheets

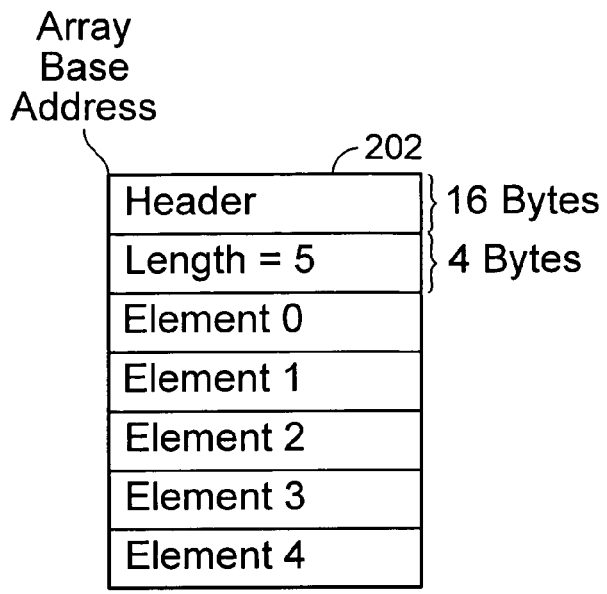
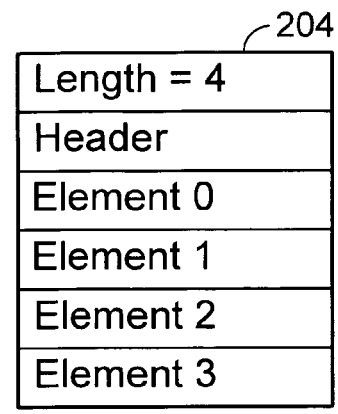
FIG. 2A  FIG. 2B
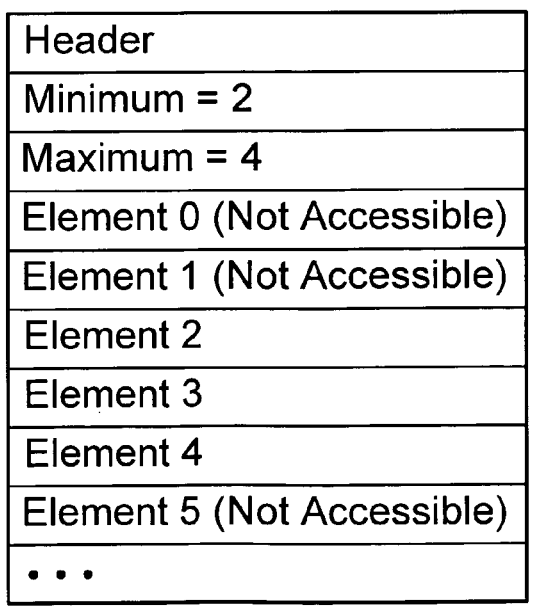
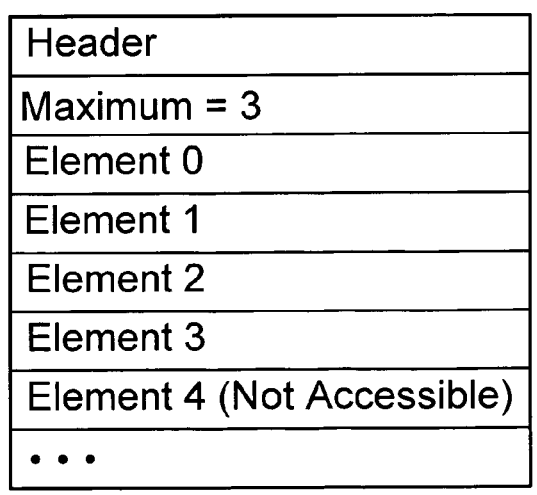
FIG. 2C  FIG. 2D

ARRAY ACCESS

BACKGROUND OF THE INVENTION

Arrays are frequently used data structures in computer systems. A common form of array data structure includes elements that are the same size, a length field indicating the number of elements in the array, and a header. To access an element in an array, a processor is typically required to determine the address of the starting location of the array elements, multiply the array element size by the index of the element to be accessed, add the multiplication result to the array base address to compute an array element address, and read from or write to the array element address. Each of the steps translates into one or more instructions in the machine language. As used herein, an instruction refers to a single operation of a processor as defined by the processor's instruction set architecture (ISA). The number of instructions involved makes array access a rather expensive function.

In some instances the index given for array access may exceed the number of elements in the array. If unchecked, such out-of-bounds access can lead to memory corruption. Many existing processor architectures, however, do not implement array boundary check at the instruction level. Thus, unless the array boundary check occurs at a higher level (such as at the application level), memory corruption due to invalid array access may not be easily prevented. It would be useful, therefore, to have a reliable way of preventing invalid array access. Furthermore, it would be desirable to implement array access instructions more efficiently.

BRIEF DESCRIPTION OF THE DRAWINGS

Various embodiments of the invention are disclosed in the following detailed description and the accompanying drawings.

FIGS. 2A-2D are diagrams illustrating several array data structure examples.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Accessing memory in an array is disclosed. In some embodiments, such access includes at least two instructions. The first instruction includes determining whether an index is within a valid range of the array, and, in the event that the index is within a valid range, determining a memory address related to an array element that corresponds to the index. The second instruction is performed in the event that the index is within a valid range. The second instruction includes accessing the array element, the access being based at least in part on the memory address determined by the first instruction.

Figure 1:
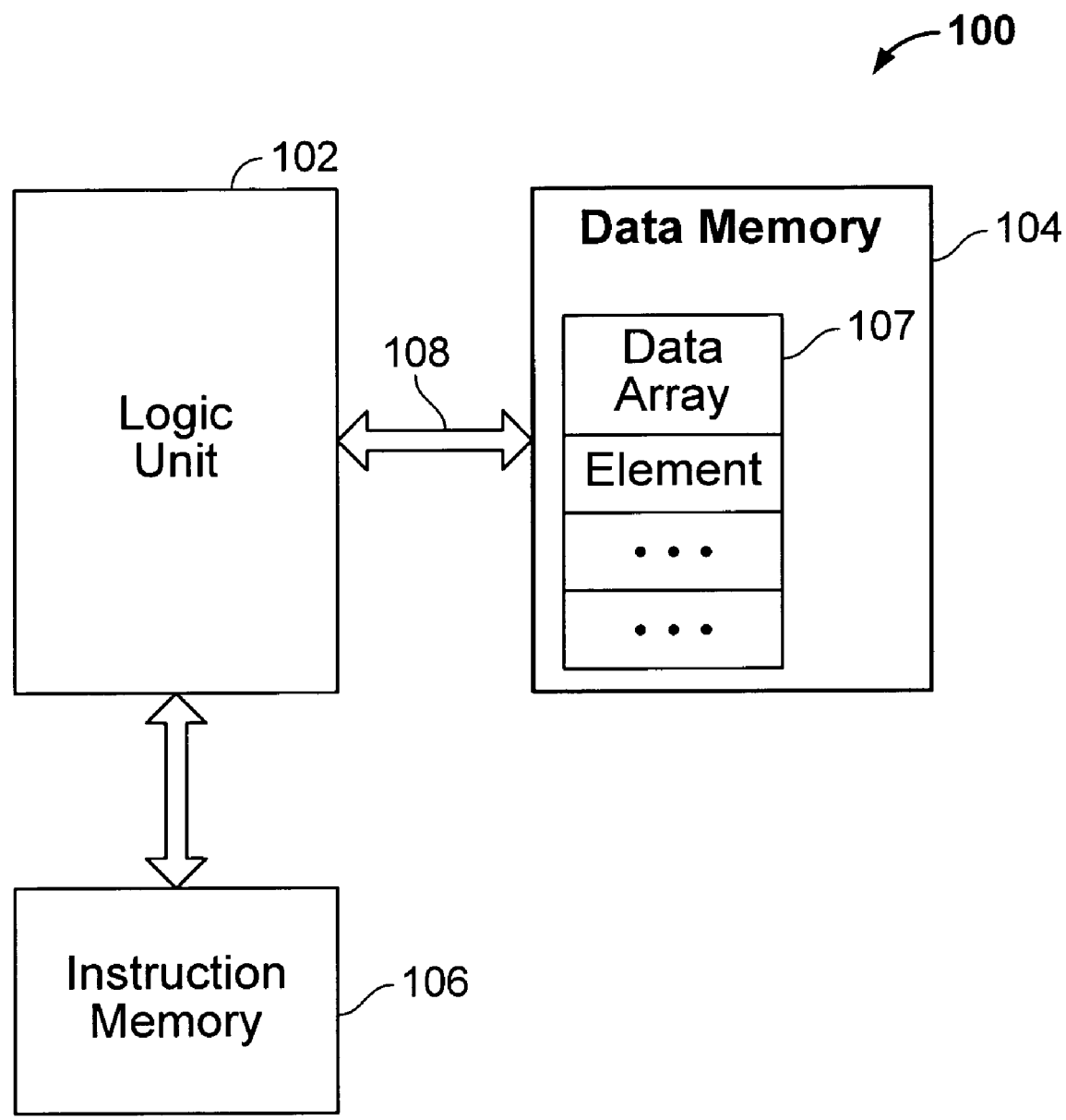
FIG. 1 is a block diagram illustrating a processor embodiment.

FIG. 1 is a block diagram illustrating a processor embodiment. In this example, processor 100 includes a logic unit 102, a data memory 104 and an instruction memory 106. Data arrays such as 107 are stored the data memory. Instruction memory 106 provides instructions to the logical unit, allowing the logic unit to access and control the data arrays via data bus 108. Details of the logic unit's operations are illustrated below. In some embodiments, the instruction memory is a component separate from the processor.

FIGS. 2A-2D are diagrams illustrating several array data structure embodiments. As will be shown in more detail below, the logic unit can be configured to perform array boundary check and array access on different array data structures, including but not limited to the ones shown in the diagrams. In FIG. 2A, data structure 202 has a header field for storing information specific to the array. The size of the header field is known and stored separately. The header field is followed by a length field that stores the number of elements in the array, which in turn is followed by the array elements. The length value is set to zero if the data structure contains no array element. In FIG. 2B, data structure 204 begins with a length field followed by a header field, which is followed by the array elements. In FIG. 2C, data structure 206 includes a minimum valid index field and a maximum valid index field for storing the minimum index of the array element accessible and the maximum index of the array element accessible, respectively. The length field is omitted. Accordingly, elements with index less than the minimum or greater than the maximum are not accessible. In FIG. 2D, the minimum valid index is assumed to be zero and only a maximum field is included in the data structure.

Figure 3:
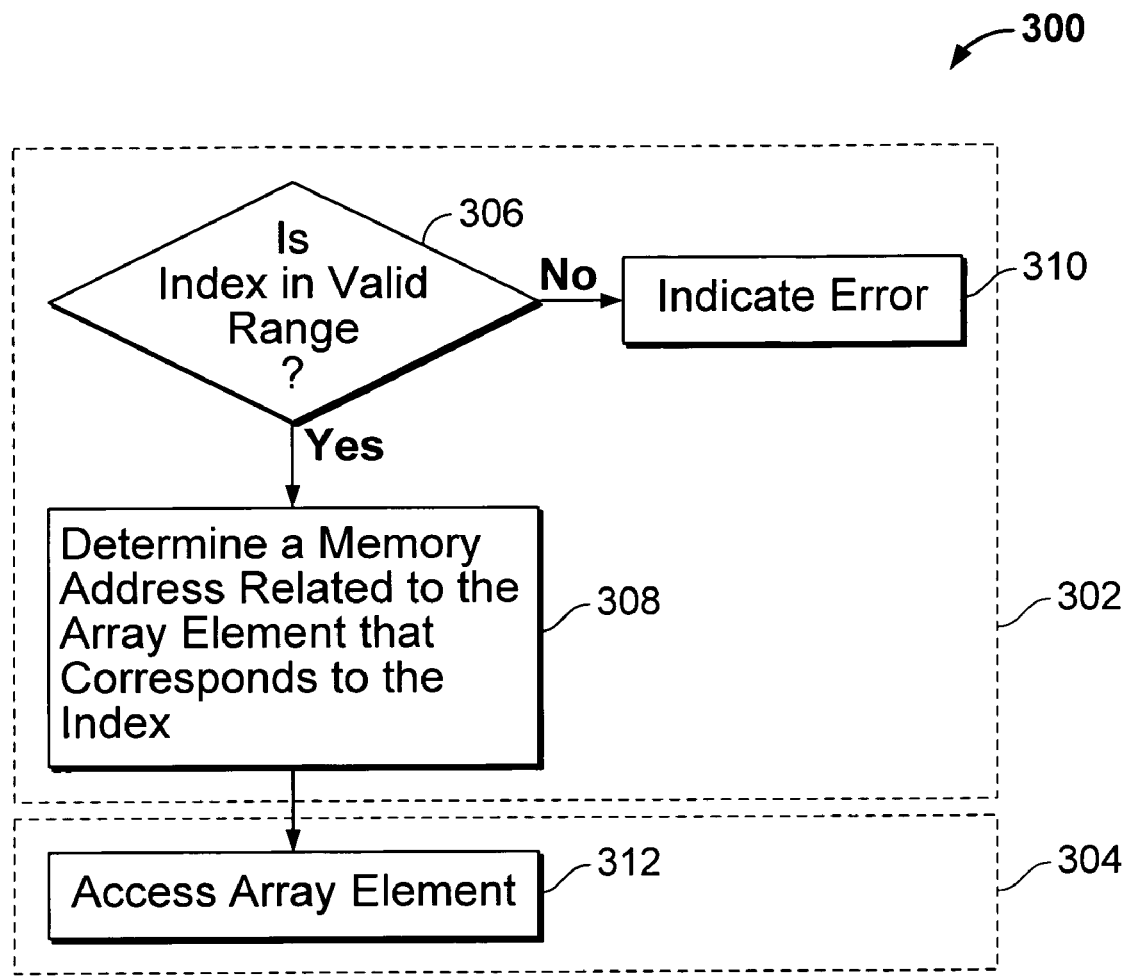
FIG. 3 is a flowchart illustrating a memory accessing method according to some embodiments.

FIG. 3 is a flowchart illustrating an embodiment of a memory accessing process. In some embodiments, process 300 is performed by a processor such as processor 100 of FIG. 1. In this example, the process includes two instructions, 302 and 304. In this embodiment, because of data access limitations, each instruction performed by the logic unit is allowed a single memory access operation. The first instruction receives an index indicating the array element to be accessed. The first instruction begins by determining whether the index is within a valid range (306). In other words, the first instruction does a boundary check to determine whether the index corresponds to a valid array element. If the index is within a valid range, a memory address related to the array element that corresponds to the index is determined (308). In this example, the memory address determined represents a fixed offset from the address of the appropriate array element. The fixed offset depends on the implementation of the instruction and the memory layout of the array. In some embodiments, the fixed offset has a value of 0. If, however, the index exceeds the valid range, the process indicates an error (310). In some embodiments, the error is treated as an exception and handled accordingly. In some embodiments, the error is handled as a user level trap. A trap handler is called through a pre-programmed trap vector without changing processor protection modes.

If the index is valid, the second instruction is performed to access the array element (312). The access is based at least in part on the memory address determined by the first instruction. The access includes reading the content of the array element, writing new content to the array element, or any other appropriate action on the array element. For example, in some embodiments, the access includes a compare-and-swap operation on the array element.

Process 300 may be implemented using any suitable syntax. An example implementation of the instructions is the following (for purposes of clarity, lines starting with # are comments describing the operations of the instructions):

```
laddX rTmp, rArrayAddress, index
# comment: the above operation performs the following logic:
# if (sign_extend(index) UGTE [rArrayAddress + gLengthOffset]), trap;
#   else (rTmp ← rArrayAddress + (sign_extend(index) << log₂X))
ldX   rValue, rTmp, Element0Offset
# comment: the above operation performs the following logic:
# rValue ← [rTmp + Element0Offset]
```

The variables and notations in the above implementation are as follows:
- index: the index of the array element to be accessed.
- rArrayAddress: the address of the array data structure.
- gLengthOffset: the difference between the address of the length field and the address of the array data structure.
- rTmp: the address of a temporary register for storing the computed address.
- X: the size of the element in bytes. (laddX instructions can include ladd1, ladd2, ladd4, ladd8, etc., and ldX instructions can include ld1, ld2, ld4, ld8, etc.).
- Element0Offset: The difference between the address of the first array element (Element0) and the address of the array data structure.
- rValue: the address of a register used to store the value of the array element.
- [ ]: memory load operation. For example [0x00001010] means reading or loading a value from memory, at memory location 0x00001010. In this example, each instruction involves a single memory load operation.
- UGTE: Unsigned Greater Than or Equal: a comparison between the two sides of this comparison operation, where each side is treated as an unsigned value. The result is true if the value of the left hand parameter is greater than or equal to the value of the right hand parameter.
- ←: load. For example, A←B means loading value of B into register A.
- <<: left shift. The left shift operation has the same effects as multiplication by powers of 2. For example, A<<3 means left shift A by 3 bits, which has the same effect as multiplying A by $2^3$.

Both the first instruction and the second instruction specify a number of fields. Depending on the implementation, a field may include an immediate value that is directly used by the instruction, a register identifier or number of a register containing a value that is used by the instruction, a register identifier or number of a register containing an address in memory where the value to be used is stored, a memory address of a memory location where the value to be used is stored, a register identifier or number of a register that the instruction will store a value into, a register identifier or number of a register containing an address in memory where the instruction will store a value, a memory address of a memory location where the instruction will store a value, or any other appropriate implementation.

In the example above, the first instruction, laddX, has three fields: index, rArrayAddress, and rTmp. The index field includes an immediate value that is directly used by the operation. The rArrayAddress field includes a register number that corresponds to a register. The register contains the address of the array data structure. The rTmp field includes a register number, and the corresponding register is used to store the address determined by the first instruction.

In the same example, the second instruction, ldX, has three fields: Element0Offset, rTmp, and rValue. The rTmp field includes a register number. The register corresponding to the register number contains the address determined by the first instruction. The Element0Offset field represents the fixed offset between the address determined by the first instruction and the address of the first array element. The rValue field includes a register number, and its corresponding register used to store the array element value loaded by the second instruction.

In the example above, the first instruction scales the index by the size of the array element in bytes. In some embodiments, however, the first instruction does not perform any scaling of the index field. In the above example, the first instruction sign-extends the index value. In some embodiments, the operation does not perform sign extension on the index.

Figure 4:
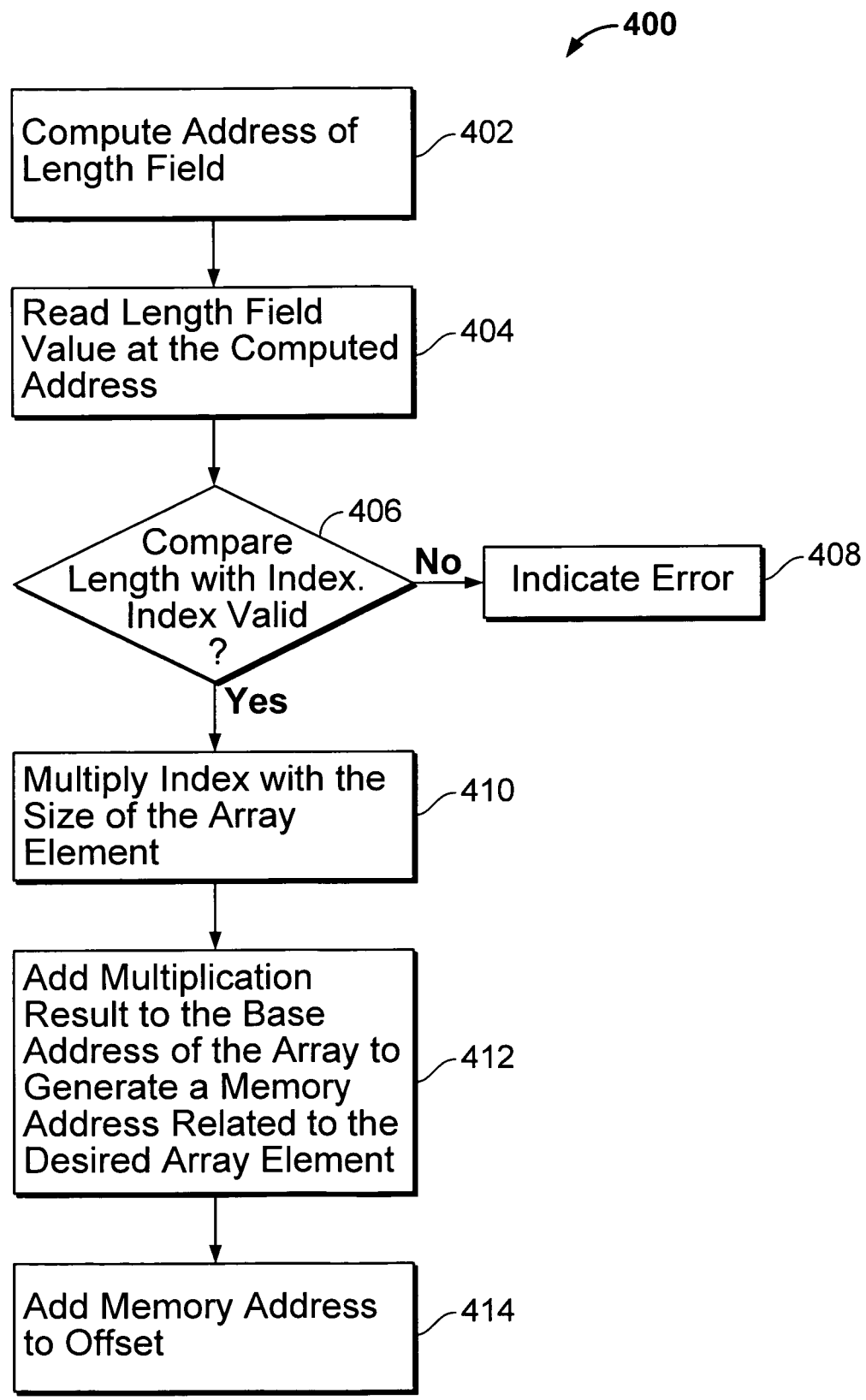
FIG. 4 is a flowchart illustrating details of the steps of certain example instructions.

FIG. 4 is a flowchart illustrating details of the steps of the example instructions shown above. Process 400 can be illustrated using array 202 as an example. The array length is not needed as a field to the first instruction. To determine whether the index is within a valid range, the address of the length field is computed by adding gLengthOffset to rArrayAddress (402). gLengthOffset is a fixed global offset value that is preconfigured, and is accessible by the first instruction without using any of it's fields. In array 202, gLengthOffset is 16 since the offset of the length field relative to the address of the array data structure is 16 bytes. The value stored at the memory address of the length field is read (404) and compared with the index (406). Since the element index is zero-based (i.e., the first element is element 0), if the index is greater or equal to the length value, it means that the index is not within the valid range of the array elements, and an error is indicated and trapped (408).

It is possible that the index field of the instruction is negative, which would indicate an invalid access. In some embodiments, the check for negative index and the check for index exceeding the length value are accomplished together by sign-extending the index to a higher bit value and doing an unsigned comparison of the sign-extended value with the length value. Sign extension is achieved by replicating the most significant bit (the sign bit) of a value to generate the sign-extended value. For example, an immediate index value may be represented using a 9-bit field, with bit 0 representing the least significant bit, and bit 8 representing the most significant bit. The index value is sign-extended to 64 bits by replicating its most significant bit 55 times to generate a new value that is 64-bit long, and retain the same values for bits 0 through 8. A negative index value has a sign bit of 1, which is stored as the most significant bit. Thus, after sign-extension, the resulting value is a 64-bit value with a most significant bit of 1. In this example, the length value is a 32-bit positive value having a most significant bit of 0. The length value is either sign extended or treated as a 64-bit unsigned value for purposes of comparison. In any event, the most significant bit of the 64 bit length value is 0. Thus, in an unsigned comparison, a sign-extended 64-bit index value with a most significant bit of 1 will be greater than the length value, which has a most significant bit of 0. When this occurs, an error is signaled. Note that if the index is a positive 32-bit value that is greater than the index, sign-extension and unsigned comparison do not change the result of the comparison, and an error is still indicated. In some embodiments, rather than doing the sign-extension and unsigned comparison, the index is directly compared to 0. An error is signaled if the index is less than 0.

If the index is a non-negative value and it is less than the length, the index is within the valid range. To compute the difference between the address of the intended array element and the address of the first array element, the index is multiplied with the size of the array element (410). Since X, the size of the element, is typically configured to be powers of 2, the multiplication is equivalent to shifting the index by the corresponding exponent of 2 (or equivalently, $\log_2 X$). In the case of array 202, the element size is 4. Assuming an index of 3 and an array length of 5, instruction 1 results in a value that is $(3<<\log_2 4)=12$.

The multiplication result is added to the address of the array data structure to determine a memory address related to the intended array element to be accessed (412). This determined memory address is not necessarily the address of the intended element. For example, the determined address will differ from the address of the intended element by some fixed offset that is equal to the distance in bytes between the array data structure and the address of the first array element. The value of the determined memory address is stored into a temporary register rTmp.

To obtain the address of the desired array element, the second instruction ldX adds rTmp to an offset, Element0Offset (414). In this example Element0Offset is an immediate field, whose value can be predefined for a given array data structure layout. In the example of array 202, Element0Offset has a value of 20 because of the 16-byte header field and the 4-byte length field separating the first element from the address of the array data structure.

The implementation of the instructions may vary in other embodiments. For example, in some embodiments, the behavior of the second instruction ldX is specified as:

```
ldX    rValue, rTmp, Element0Offset
# comment: Above operation performs the following logic:
# rValue ← [rTmp + (Element0OffsetInMultiplesOfX << log₂X)]
```

In this implementation, the field Element0OffsetInMultiplesOfX describes the value of the offset between the address of the first element of the array (element0) and to the address of the array data structure. In some embodiments, the offset is passed to ldX as a field that is an immediate value. Returning to array 202 as an example, for X of 1, the value used for Element0OffsetInMultiplesOfX is 20; for X of 2, the value used for Element0OffsetInMultiplesOfX is 10; for X of 4, the value used for Element0OffsetInMultiplesOfX is 5. In some embodiments where the array element addresses are to be aligned to their sizes, a special case arises for X of 8. In such embodiments, an 8-byte element array includes an extra 4 bytes of padding after the length field, resulting in an offset of 24 bytes. Thus, the value used for Element0OffsetInMultiplesOfX is 3, which would yield 24 when shifted by $\log_2 8$.

In some implementations, rather than specifying a length, a data structure specifies a minimum field and a maximum field. Data structure 208 of FIG. 2D is an example of such a data structure. Accordingly, laddX is modified to compute the addresses of the minimum and maximum fields, load the minimum and maximum values, and compare them with the index to determine whether the index is valid. In some embodiments, a data structure such as 206 of FIG. 2C may specify only a maximum field and set the minimum to a default value of 0. laddX is modified to compare the index with the value in the maximum field.

In some embodiments, X is included as a field of the instructions and $\log_2 X$ is computed. In some embodiments, several different versions of laddX and ldX are implemented depending on the size of the element, X. For example, some embodiments have instructions ladd2 and ld2 that correspond to element size of 2, ladd4 and ld4 that correspond to element size of 4, etc. During operation, depending on the element size, the appropriate instruction that corresponds to the element size is invoked. Some examples are shown below, although other instructions corresponding to different element sizes may also be implemented:

```
ladd2 rTmp, rArrayAddress, index
# if(index >= [rArrayAddress + gLengthOffset]), trap;
#          else   {rTmp ← rArrayAddress + (index << 1)}
ld2      rValue, [rTmp + (10 << 1)]
``` and

```
ladd4 rTmp, rArrayAddress, index
# if(index >= [rArrayAddress + gLengthOffset]), trap;
#          else   {rTmp ← rArrayAddress + (index << 2)}
ld4      rValue ← [rTmp + 5 << 2]
```

Instruction level array access has been disclosed. Providing array boundary check at instruction level guards against invalid array access and is efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of accessing memory in an array, comprising:
    performing a first instruction, including:
        determining whether an index used by the first instruction is within a valid range; and
        in the event that the index is within a valid range, determining a memory address related to an array element that corresponds to the index; and
    in the event that the index is within a valid range, performing a second instruction to access the array element, the access being based at least in part on the memory address determined by the first instruction;
    wherein the first instruction does not include an array length field.

2. A method as recited in claim 1, wherein performing the first instruction further includes, in the event that the index is not within the valid range, indicating that an error has occurred.

3. A method as recited in claim 1, wherein determining whether the index used by the first instruction is within the valid range includes sign extending the index.

4. A method as recited in claim 1, wherein determining whether the index used by the first instruction is within the valid range includes comparing the index with the array length field.

5. A method as recited in claim 1, wherein determining whether the index used by the first instruction is within the valid range includes performing an unsigned comparison of the index and the array length field.

6. A method as recited in claim 1, wherein determining whether the index used by the first instruction is within the valid range includes comparing the index with a minimum valid index and with a maximum valid index.

7. A method as recited in claim 6, wherein the minimum valid index has a default value of zero.

8. A method as recited in claim 1, wherein the first instruction includes an index field, an array address field, and a register field for storing the determined memory address.

9. A method as recited in claim 1, wherein accessing the array element includes reading a value from the array element.

10. A method as recited in claim 1, wherein accessing the array element includes storing a value to the array element.

11. A method as recited in claim 1, wherein the second instruction determines an address of the array element based on an offset field and the memory address determined by the first instruction.

12. A method as recited in claim 11, wherein the second instruction determines the address of the array element by adding the offset to the memory address determined by the first instruction.

13. A method as recited in claim 11, wherein the second instruction determines the address of the array element by scaling the offset and adding the scaled offset to the memory address determined by the first instruction.

14. A method as recited in claim 1, wherein the first and the second instructions each performs exactly one memory access operation.

15. A method as recited in claim 1, wherein the first instruction and the second instruction are selected from a plurality of instructions, and the selection being dependent at least in part on the size of the array element.

16. A method of accessing memory in an array, comprising:
performing a first instruction, including:
   determining whether an index used by the first instruction is within a valid range; and
   in the event that the index is within a valid range, determining a memory address related to an array element that corresponds to the index; and
in the event that the index is within a valid range, performing a second instruction to access the array element, the access being based at least in part on the memory address determined by the first instruction;
wherein the first instruction is provided with an array address field indicating the address of an array data structure, and determining whether the index used by the first instruction is within the valid range includes loading a length value stored at a fixed offset from the address of the array data structure.

17. A method of accessing memory in an array, comprising:
performing a first instruction, including:
   determining whether an index used by the first instruction is within a valid range; and
   in the event that the index is within a valid range, determining a memory address related to an array element that corresponds to the index; and
in the event that the index is within a valid range, performing a second instruction to access the array element, the access being based at least in part on the memory address determined by the first instruction;
wherein the first instruction is provided with an array address field indicating the address of an array data structure, and determining whether the index used by the first instruction is within the valid range includes loading a minimum valid range value stored at a fixed offset from the address of the array data structure.

18. A method of accessing memory in an array, comprising:
performing a first instruction, including:
   determining whether an index used by the first instruction is within a valid range; and
   in the event that the index is within a valid range, determining a memory address related to an array element that corresponds to the index; and
in the event that the index is within a valid range, performing a second instruction to access the array element, the access being based at least in part on the memory address determined by the first instruction;
wherein the first instruction is provided with an array address field indicating the address of an array data structure, and determining whether the index used by the first instruction is within range includes loading a maximum valid range value stored in memory at a fixed offset from the address of the array data structure.

19. A method of accessing memory in an array, comprising:
performing a first instruction, including:
   determining whether an index used by the first instruction is within a valid range; and
   in the event that the index is within a valid range, determining a memory address related to an array element that corresponds to the index; and
in the event that the index is within a valid range, performing a second instruction to access the array element, the access being based at least in part on the memory address determined by the first instruction;
wherein determining the memory address related to the array element includes shifting the index to obtain a shifted value that equals the index multiplied by the size of an element in the array, and adding the shifted value to a reference.

20. A processor comprising:
a logical unit configured to access an array, including to:
   perform a first instruction, including:
      determining whether an index used by the first instruction is within a valid range,
      in the event that the index is within a valid range, determining a memory address related to an array element that corresponds to the index; and
   in the event that the index is within the valid range, perform a second instruction to access the array element, the access being based at least in part on the memory address determined by the first instruction;
   wherein the first instruction does not include an array length field; and
a memory coupled to the logic unit, configured to store the array.

21. The processor of claim 20, wherein performing the first instruction further includes, in the event that the index is not within the valid range, indicating that an error has occurred.

22. The processor of claim 20, wherein determining whether the index used by the first instruction is within the valid range includes sign extending the index.

23. The processor of claim 20, wherein determining whether the index used by the first instruction is within the valid range includes comparing the index with the array length field.

24. The processor of claim 20, wherein determining whether the index used by the first instruction is within the valid range includes performing an unsigned comparison of the index and the array length field.

25. The processor of claim 20, wherein the first instruction includes an index field, an array address field, and a register field for storing the determined memory address.

26. The processor of claim 20, wherein the first and the second instructions each performs exactly one memory access operation.

27. The processor of claim 20, wherein the first instruction and the second instruction are selected from a plurality of instructions, and the selection being dependent at least in part on the size of the array element.

28. A system for accessing memory in an array, comprising:
a processor configured to:
perform a first instruction, including:
determining whether an index used by the first instruction is within a valid range,
in the event that the index is within a valid range, determining a memory address related to an array element that corresponds to the index; and
in the event that the index is within the valid range, perform a second instruction to access the array element, the access being based at least in part on the memory address determined by the first instruction;
wherein the first instruction does not include an array length field; and
a memory coupled to the processor, configured to the provide the processor with the first and the second instruction.

29. The system of claim 28, wherein performing the first instruction further includes, in the event that the index is not within the valid range, indicating that an error has occurred.

30. The system of claim 28, wherein determining whether the index used by the first instruction is within the valid range includes sign extending the index.

31. The system of claim 28, wherein determining whether the index used by the first instruction is within the valid range includes comparing the index with the array length field.

32. The system of claim 28, wherein determining whether the index used by the first instruction is within the valid range includes performing an unsigned comparison of the index and the array length field.

33. The system of claim 28, wherein the first instruction includes an index field, an array address field, and a register field for storing the determined memory address.

34. The system of claim 28, wherein the first and the second instructions each performs exactly one memory access operation.

35. The system of claim 28, wherein the first instruction and the second instruction are selected from a plurality of instructions, and the selection being dependent at least in part on the size of the array element.

36. A processor comprising:
a logical unit configured to access an array, including to:
perform a first instruction, including:
determining whether an index used by the first instruction is within a valid range,
in the event that the index is within a valid range, determining a memory address related to an array element that corresponds to the index; and
in the event that the index is within the valid range, perform a second instruction to access the array element, the access being based at least in part on the memory address determined by the first instruction;
wherein the first instruction is provided with an array address field indicating the address of an array data structure, and determining whether the index used by the first instruction is within the valid range includes loading a length value stored at a fixed offset from the address of the array data structure; and
a memory coupled to the logic unit, configured to store the array.

37. A system for accessing memory in an array, comprising:
a processor configured to:
perform a first instruction, including:
determining whether an index used by the first instruction is within a valid range,
in the event that the index is within a valid range, determining a memory address related to an array element that corresponds to the index; and
in the event that the index is within the valid range, perform a second instruction to access the array element, the access being based at least in part on the memory address determined by the first instruction;
wherein the first instruction is provided with an array address field indicating the address of an array data structure, and determining whether the index used by the first instruction is within the valid range includes loading a length value stored at a fixed offset from the address of the array data structure; and
a memory coupled to the processor, configured to the provide the processor with the first and the second instruction.

* * * * *